United States Patent Office 3,093,671
Patented June 11, 1963

3,093,671
CYCLIC DIENE GROUP VI-B METAL CARBONYLS
Kryn G. Ihrman, Royal Oak, and Thomas H. Coffield, Farmington, Mich., assignors to Ethyl Corporation, New York, N.Y., a corporation of Delaware
No Drawing. Filed Nov. 14, 1960, Ser. No. 68,587
13 Claims. (Cl. 260—438)

This invention relates to novel organometallic compounds and their mode of preparation. More specifically, this invention relates to organometallic compounds in which a cyclic diene selected from the group consisting of cyclooctadiene and bicycloheptadiene molecules is bonded to a transition metal which is, in turn, bonded to a plurality of carbonyl groups.

It is an object of this invention to provide a novel class of cyclic diene-transition metal-carbonyl compounds, in which the cyclic diene contains either 7 or 8 carbon atoms in the ring. The cyclic dienes which may be bonded to the transition metal are cyclooctadiene and bicycloheptadiene compounds. A further object is to provide a process for the preparation of these compounds. Additional objects of this invention will become apparent from a reading of the specification and claims which follow.

The objects of this invention are accomplished by providing compounds represented by the following formula:

$$QM(CO)_x$$

in which Q is a cyclic diene containing 7 or 8 carbon atoms in the ring and may be a cyclooctadiene or a bicycloheptadiene compound. M is iron or a transition metal of group VIB and $x$ is an integer ranging from 3 to 4. In the new compounds of this invention, the cyclic diene represented by Q donates 4 electrons to the metal atom, M, and each carbonyl group donates 2 electrons to the metal atom. By virtue of the electrons donated to the metal atom, it achieves the electron configuration of the next higher inert gas above M in the periodic table.

As stated above, Q is a cyclic diene which contains either 7 or 8 ring carbon atoms. Included within this definition of Q are cyclooctadiene molecules which contain an 8-membered carbocyclic ring containing 2 double bonds and bicycloheptadiene molecules. If Q is a cyclooctadiene molecule, it may be a 1,3-, 1,4-, or 1,5-cyclooctadiene. The cyclooctadiene may be substituted with 12 R groups on the carbon atoms of the ring which may be the same or different and are selected from the group consisting of hydrogen and monovalent hydrocarbon radicals containing from one to about eight carbon atoms. Typical of such monovalent hydrocarbon radicals are alkyl, aryl, cycloalkyl, alkenyl, cycloalkenyl, aralkyl and alkaryl radicals. Typical of these radicals are methyl, propyl, phenyl, tert-butyl, p-chlorophenyl, neopentyl, chloromethyl, octyl, cyclohexyl, propenyl, cyclopentyl, cyclopentenyl, cyclopropyl, 2-methyl-2-butenyl, cyclohexenyl, benzyl, 2-phenylethyl, p-ethylphenyl, 2,4-dimethylphenyl and tolyl.

Preferred substituent groups, R, are hydrogen and monovalent aliphatic hydrocarbon groups containing from one to about eight carbon atoms. It is further preferred that the sum of the carbon atoms in all of the R substituent groups does not exceed ten. It is found that when this preference is satisfied, the compounds have superior physical characteristics rendering them of greatest utility as additives to hydrocarbon fuels.

Preferably, the cyclooctadiene is a 1,5-cyclooctadiene compound since those of our compounds containing this moiety as Q are more stable than our compounds formed from 1,3- and 1,4-cyclooctadienes.

Q, as shown in the above formula, can also be a [2.2.1]-bicyclohepta-2,5-diene and has the following structural configuration

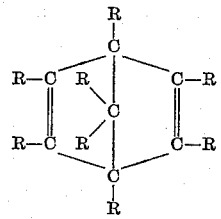

wherein each of the R groups may be the same or different and are selected from the group consisting of hydrogen and monovalent hydrocarbon radicals containing from one to about eight carbon atoms. Typical of such monovalent hydrocarbon radicals are alkyl, aryl, cycloalkyl, alkenyl, cycloalkenyl, aralkyl and alkaryl radicals. Typical of these radicals are methyl, propyl, phenyl, tert-butyl, p-chlorophenyl, neo-pentyl, chloromethyl, octyl, cyclohexyl, propenyl, cyclopentyl, cyclopentenyl cyclopropyl, 2-methyl-2-butenyl, cyclohexenyl, benzyl, 2-phenylethyl, p-ethylphenyl, 2,4-dimethylphenyl and tolyl.

Preferred substituent groups, R, are hydrogen and monovalent aliphatic hydrocarbon groups containing from one to about 8 carbon atoms. It is further preferred that the sum of the carbon atoms in all of the R substituent groups does not exceed ten. It is found that when this preference is satisfied, the compounds have superior physical characteristics rendering them of greatest utility as additives to hydrocarbon fuels.

The metal, M, in the above formula is iron or a group VIB metal. Thus, the metal can be iron, chromium, molybdenum, or tungsten. Preferred metals are chromium, molybdenum, and iron since, in general, the metals form our compounds quite readily.

Typical of the compounds of our invention are 3-octyl-7-ethyl-1,5-cyclooctadiene chromium tetracarbonyl, 2-ethyl-1,3-cyclooctadiene chromium tetracarbonyl, 3-methyl-1,4-cyclooctadiene molybdenum tetracarbonyl, 2-cyclopropyl-1,5-cyclooctadiene iron tricarbonyl, 3-cyclopentenyl-1,5-cyclooctadiene molybdenum tetracarbonyl, 3,4-dimethyl-1,5-cyclooctadiene iron tricarbonyl, 3-p-ethylphenyl-1,5-cyclooctadiene tungsten tetracarbonyl, and the like.

Other typical compounds of our invention are 1-ethyl-[2.2.1]-bicyclohepta-2,5-diene chromium tetracarbonyl, 2-cyclopentyl-[2.2.1]-bicyclohepta-2,5-diene molybdenum tetracarbonyl, 2-methyl-[2.2.1]-bicyclohepta-2,5-diene iron tricarbonyl, [2.2.1]-bicyclohepta-2,5-diene chromium tetracarbonyl, [2.2.1]-bicyclohepta-2,5-diene molybdenum tetracarbonyl, [2.2.1]-bicyclohepta-2,5-diene iron tricarbonyl, 2-ethyl-[2.2.1]-bicyclohepta-2,5-diene tungsten tetracarbonyl, and the like.

The compounds of the invention are produced by the reaction of a cyclic diene containing either 7 or 8 ring carbon atoms, which includes cyclooctadiene and bicycloheptadiene compounds, with a metal carbonyl compound of iron or a group VIB metal. In this reaction, the cyclic diene displaces 2 carbon monoxide groups from the metal carbonyl reactant to form either a cyclooctadiene-metal-carbonyl compound, or a bicycloheptadiene metal carbonyl compound containing 2 less carbonyl groups than were present in the original metal carbonyl reactant.

In general, the process may be carried out at temperatures between about 75 to about 200° C. Preferably, however, temperatures in the range from about 100 to about 150° C. are employed since, within this range, relatively higher yields are obtained with a minimum of undesirable side reactions. The pressure under which the process is carried out is not critical. Preferably, however, the process is conducted at atmospheric pressure or slightly higher although higher pressures, up to 500 atmospheres, can be employed if desired.

The process is generally conducted under a blanketing atmosphere of an inert gas such as nitrogen, helium, argon, and the like.

The process may be conducted in the presence of a non-reactive solvent. The nature of the solvent is not critical and, in fact, the cyclooctadiene or bicycloheptadiene reactant may, in some cases, be used in sufficient excess to serve as a reaction solvent.

Typical of reaction solvents which may be employed in our process are high boiling saturated hydrocarbons such as n-octane, n-decane, and other paraffinic hydrocarbons having up to about 20 carbon atoms such as eicosane, pentadecane, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysiloxanes, hexapropyldisilane, and diethyldipropyldiphenyldisilane may also be employed. Other ester solvents are those derived from succinic, maleic, glutaric, adipic, pimelic, suberic, azelaic, sebacic and pinic acids. Specific examples of such esters are di-(2-ethylhexyl) adipate, di-(2-ethylhexyl) azelate, di-(2-ethylhexyl) sebacate, di-(methylcyclohexyl) adipate and the like. Of these enumerated solvents, those which are preferred for use in the process are the high boiling ethers and saturated aliphatic hydrocarbons. All of the above solvents will not be suitable for all of the specific embodiments of the invention since certain of the metal carbonyl reactants are relatively insoluble in some of the above solvents. Thus, care should be used in selecting the specific solvent for the specific reaction.

The particular solvent employed in any embodiment of the process should be selected from those solvents having the requisite boiling and/or freezing point. Frequently the boiling point of the solvent is used to control the reaction temperature when the process is carried out at atmospheric pressure. In such cases, the reaction mixture is heated at reflux, and the reflux temperature is determined by the boiling point of the solvent. The ease of separating the product from the solvent depends on the degree of difference between the boiling and/or freezing point of the product and the solvent. If the product is a liquid having a boiling point close to that of the solvent, it is obvious that separation will be difficult. In order to avoid this, it is preferable to select a solvent whose normal boiling point varies by at least 25° C. from the normal boiling point of a liquid product. If, on the other hand, the product is a solid, it is desirable that the freezing point of the solvent be at least 25° C. less than the temperature at which separation of the product is effected through crystallization. Obviously, if the solvent freezes before the solid product precipitates, it will be impossible to make a separation through crystallization.

The above criteria, as to physical properties of the solvent, are not unique to this process. In any chemical process, it is necessary to pick a solvent whose physical properties make it readily separable from the product being formed. It is deemed, therefore, within the skill of the art to select the most suitable solvent for use in any particular embodiment of the process of the invention.

The process is preferably conducted with agitation of the reaction mixture. Although agitation is not critical to the success or failure of the process, its use is preferred since it accomplishes a smooth and even reaction rate.

The time required for the process varies depending on the other reaction variables. In general, however, a time period from about 30 minutes to about 24 hours is sufficient.

In some cases, the process is advantageously carried out in the presence of an ultraviolet light source. This tends to decrease the reaction time and give a higher yield of product.

In general, the metal carbonyl reactant employed in the process is more expensive than the cyclooctadiene or bicycloheptadiene reactant. In order to insure maximum conversion of the metal carbonyl, it is, therefore, preferred to use excess quantities of the cyclooctadiene or bicycloheptadiene reactant. Generally, from about one to about 10 moles of a cyclooctadiene or bicycloheptadiene compound are employed for each mole of metal carbonyl reactant since, within this range, a good conversion of the metal carbonyl is obtained. In some cases, the cyclooctadiene or bicycloheptadiene reactant may be more expensive than the particular metal carbonyl employed. In these instances, excess carbonyl will be employed to insure complete conversion of the cyclooctadiene or bicycloheptadiene compound.

In some cases, hydroquinone or other free radical reaction inhibitors can be employed in the reaction to prevent polymerization of the cyclooctadiene or bicycloheptadiene reactant. Their presence is not critical, however, to the success of the reaction. Typical of other applicable free radical inhibitors are p-tert-butyl catechol, p-hydroxy anisole, 4-amino-1-naphthol, chloranil, 2,4-dinitro-chlorobenzene, dithiocarbamate and the like.

To further illustrate the compounds of the invention and their mode of preparation, there are presented the following examples in which all parts and percentages are by weight unless otherwise indicated.

*Example I*

A mixture comprising 10 parts of molybdenum hexacarbonyl, 8.7 parts of 1,5-cyclooctadiene, 17.94 parts of n-nonane and a trace of hydroquinone was heated at reflux, under nitrogen, for five hours at a temperature ranging between 141–149° C. The reaction product was then filtered, and the filtrate was placed under vacuum to distill off unreacted volatile starting materials. White crystals appeared in the remaining residue. These crystals were collected by means of filtration and were dried in vacuo. The crystals were sublimed onto a water-cooled probe by heating at one mm. Hg and 90° C. There was obtained about 0.5 part of 1,5-cyclooctadiene molybdenum tetracarbonyl as pale-yellow crystals having a melting point of 137–139° C. with decomposition. The infrared spectrum of the product showed metallocarbonyl bands at 4.9, 5.1 and 5.24 microns with carbon-hydrogen stretching at 3.4 microns. The product was unstable in solution but seemed to be relatively air-stable. On analysis, there was found: C, 45.8; H, 3.9 and Mo, 30.5. Calculated for $C_{12}H_{12}MoO_4$: C, 45.6; H, 3.8 and Mo, 30.4 percent.

When the preceding example is repeated at a reaction temperature of 100° C. and atmospheric pressure, or under slight pressure at 150° C., good yields of cyclooctadiene molybdenum tetracarbonyl are obtained.

*Example II*

One-tenth mole of 1,5-cyclooctadiene and 0.05 mole of chromium hexacarbonyl in n-nonane solvent with a trace of hydroquinone was heated at reflux for eight hours. The reaction product was discharged from the reaction vessel and filtered; excess solvent and unreacted starting materials were removed from the filtrate by heating under vacuum, and the residue was sublimed to yield cyclooctadiene chromium tetracarbonyl.

*Example III*

A mixture comprising about 0.25 mole of 1,5-cyclooctadiene and 0.25 mole of iron pentacarbonyl and a trace of hydroquinone was heated under about 100 p.s.i. nitrogen pressure. After heating in excess of two hours at temperatures up to about 220° C., the reaction product was discharged, and distilled in vacuo. A yellow oil was collected at 47° C. and 2 mm. which was purified by chromatography to yield 1,5-cyclooctadiene iron tricarbonyl.

*Example IV*

A mixture of 9.8 parts of iron pentacarbonyl, 10.8 parts of bicycloheptadiene, 21.5 parts of n-nonane, and a trace of hydroquinone was heated under nitrogen at reflux for 4.5 hours at temperatures ranging between 110 to about 130° C. During this period, a steady evolution of gas was observed, the total volume of which closely approximated that expected from displacement of two of the carbonyl groups in iron pentacarbonyl by bicycloheptadiene. The reaction mixture was then cooled and filtered to remove any insoluble metallic residues, and the filtrate was heated under vacuum to remove volatile unreacted starting materials. The remaining oil was distilled at one mm. Hg and 70–100° C. The distillate was chromatographed through alumina using petroleum ether (37–43° C. B.P.) as the eluant. Collection and evaporation of the orange eluate yielded an orange oil which was further distilled into a cup held beneath a cold finger at one mm. Hg and 40° C. Fractionation of the distillate gave a fraction boiling at 49–50° C. at 0.1 mm. Hg. which is bicycloheptadiene iron tricarbonyl. Its elemental analysis, infrared spectrum showing strong absorption at 3.43, 4.95 and 5.1 microns, and its ultra violet spectrum showing strong absorption at 214 millimicrons (extinction coefficient 17,160) and 282 millimicrons (extinction coefficient 2,140) identified the product as bicycloheptadiene iron tricarbonyl.

When the preceding example is repeated at a reaction temperature of 100° C. and atmospheric pressure, or under slight pressure at 150° C., good yields of [2.2.1]-bicyclohepta-2,5-diene iron tricarbonyl are obtained.

*Example V*

A mixture of 25 parts of molybdenum hexacarbonyl, 20 parts of bicycloheptadiene, 10.8 parts of n-nonane and a trace of hydroquinone was heated at reflux under nitrogen for four hours at 100–115° C. During this period, evolution of carbon monoxide gas was observed. The quantity of carbon monoxide gas evolved was that predicted from a displacement of two carbonyl groups from molybdenum hexacarbonyl by bicycloheptadiene. The reaction mixture was then cooled and filtered. The filtrate crystallized on standing to yield crystals which were separated by means of filtration followed by recrystallization from cyclohexane to yield 14 parts of crude bicycloheptadiene molybdenum tetracarbonyl. About two parts of this product were sublimed onto a water-cooled probe by heating at one mm. Hg and 70° C. The sublimate was obtained as yellow needles having a melting point of 78–80° C. Both infrared and elemental analysis of the product showed it to be bicycloheptadiene molybdenum tetracarbonyl. The infrared spectrum of the compound showed CH stretching at 3.3, 3.4 and 3.5 microns with metallocarbonyl bands at 4.9, 5.1 and 5.23 microns. On analysis, there was found: C, 43.7; H, 2.64 and Mo, 32.1. Calculated for $C_{11}H_8MoO_4$: C, 44.0; H, 2.66 and Mo, 32.0 percent. The compounds were fairly air-stable but decomposed slowly in solution.

*Example VI*

Bicycloheptadiene was reacted with chromium hexacarbonyl using diethyleneglycol dimethyl ether as the solvent in a manner similar to that employed in the preceding example. On heating the reaction mixture under nitrogen at reflux for eight hours, a 79 percent yield of bicycloheptadiene chromium tetracarbonyl was obtained. The compound was identified by means of elemental analysis and had a melting point of 99–100° C.

*Example VII*

A solution comprising 0.5 mole of 1,5-cyclooctadiene and 0.3 mole of tungsten carbonyl in n-nonane is heated for 14 hours at reflux under nitrogen. The reaction product is discharged from the reaction vessel and filtered after which excess solvent is removed from the filtrate by heating under vacuum. The residue is dissolved in low-boiling petroleum ether and chromatographed on alumina to yield an eluate, which on heating in vacuo, gives a good yield of 1,5-cyclooctadiene tungsten tetracarbonyl.

*Example VIII*

A solution comprising 0.2 mole of 3-ethyl-1,5-cyclooctadiene and 0.2 mole of molybdenum hexacarbonyl in diethylene glycol dimethyl ether is heated, at reflux, under nitrogen for six hours. On filtration of the reaction product and removal of solvent by heating in vacuo, a good yield of 3-ethyl-1,5-cyclooctadiene molybdenum tetracarbonyl is obtained from the residue by means of chromatographic separation.

*Example IX*

A mixture of 0.05 mole of triiron dodecacarbonyl and 0.2 mole of bicycloheptadiene is stirred and heated at reflux in an inert atmosphere for 30 minutes. During this time, a copious evolution of gas is noted. The reddish-brown solution is cooled, filtered, and the filtrate is distilled. On fractionation of the distillate, a good yield of bicycloheptadiene iron tricarbonyl is obtained.

*Example X*

A brown solution comprising 97.95 parts of iron carbonyl, 138.2 parts of bicycloheptadiene containing a trace amount of hydroquinone, and 211 parts of isooctane was refluxed at a temperature ranging from 90 to 102° C. for 50 hours. During this time, a steady evolution of gas was observed. The brown reaction product containing dark-brown viscous material was filtered, and the isooctane and unreacted bicycloheptadiene and iron carbonyl were removed by heating the filtrate in vacuo. The filtrate was then fractionated using a Vigreux column to give, as a main fraction, 40 parts of an orange-red liquid boiling at 56.5–59.0° C. (0.1–0.25 mm. Hg). This fraction was found, by means of vapor phase chromatography, to be a mixture containing several components. By thoroughly fractionating this mixture, 28.2 parts (24.3 percent yield) of red-orange bicycloheptadiene iron tricarbonyl (boiling at 49–50° C./0.1 mm. Hg) was separated. The I.R. spectrum of the product showed bands at 3.43, 4.95 and 5.1 microns. The elemental analysis and I.R. spectrum showed the product to be bicycloheptadiene iron tricarbonyl.

*Example XI*

A mixture comprising 10 parts of iron pentacarbonyl and 2.3 parts of bicycloheptadiene was heated by irradiating the mixture with an ultraviolet light source. The mixture was so heated at reflux for 4.5 hours. During this period, gas was slowly evolved. The product was then thoroughly fractionated to give 8.4 parts of bicycloheptadiene iron tricarbonyl. This amounted to a yield which was 72 percent of the theoretical. The elemental analysis, I.R. spectrum, and U.V. spectrum of the product showed it to be bicycloheptadiene iron tricarbonyl.

A comparison of the result set forth in Examples V and VI demonstrates the beneficial effect of ultraviolet light observed in the preparation of some of the compounds of the invention. As shown in Example V, a yield of 24.3 percent resulted from refluxing iron carbonyl and bicycloheptadiene for 50 hours. In Example VI, a 72 percent yield was obtained after refluxing only 4.5 hours. This constitutes approximately a three-fold increase in the yield using a reaction time in the order of one-tenth of that required in Example X.

*Example XII*

A solution is formed by dissolving 0.1 mole of 1-ethyl-2-octyl-[2.2.1]-bicyclohepta-2,5-diene and 0.5 mole of molybdenum hexacarbonyl in diethyleneglycol dimethyl-ether. The solution is heated at reflux for six hours under nitrogen after which it is filtered, and solvent is removed by heating under vacuum. The residue is dissolved in low-boiling petroleum ether and chromatographed on alumina. The product band is then heated in vacuo to give a good yield of 1-ethyl-2-octyl-[2.2.1]-bicyclohepta-2,5-diene molybdenum tetracarbonyl.

The compounds are useful antiknocks when added to a petroleum hydrocarbon. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock our compounds may be present in the gasoline in combination with typical scavengers such as ethylene dichloride, ethylene dibromide, tricresylphosphate and the like.

The compounds are further useful in many metal plating applications. In order to effect metal plating using the compounds they are decomposed in an evacuated space containing the object to be plated. On decomposition the lay down a film of metal on the object. The gaseous plating may be carried out in the presence of an inert gas so as to prevent oxidation of the plating metal or the object to be plated during the plating operation.

The gaseous plating technique described above finds wide application in forming coatings which are not only decorative but also protect the underlying substrate material. When the metal is a conductor such as molybdenum, this technique enables the preparation of plated circuits which find wide application in the electrical arts.

Deposition of metal on a glass cloth illustrates the applied process. A glass cloth band weighing one gram is dried for one hour in an oven at 150° C. It is then placed in a tube which is devoid of air and there is added to the tube 0.5 gram of bicycloheptadiene molybdenum tetracarbonyl. The tube is heated at 400° C. for one hour after which time it is cooled and opened. The cloth has a uniform metallic grey appearance and exhibits a gain in weight of about 0.02 grams. The cloth has greatly decreased resistivity and each individual fiber proves to be a conductor. An application of current to the cloth causes an increase in its temperature. Thus, a conducting cloth is prepared which can be used to reduce static electricity, for decorative purposes, for thermal insulation by reflection and as a heating element.

As a further example of our process, a glass cloth band weighing one gram is dried for one hour in an oven at 150° C. It is then placed in a tube which is devoid of air and there is added to the tube 0.5 gram of 1,5-cyclooctadiene molybdenum tetracarbonyl. The tube is heated at 400° C. for one hour after which time it is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared which can be used to reduce static electricity for decorative purposes, for thermal insulation by reflection and as a heating element.

The compounds may be added to distillate fuels such as are used in home heating, to jet engine fuels and also to diesel fuels. In these applications the compounds tend to reduce smoke and/or soot formation on burning of the fuel. Also our compounds are useful additives to lubricant compositions where they act to improve the lubricity of the lubricant and reduce wear of the rubbing surfaces.

Having fully described the compounds, their mode of preparation and their many utilities, it is desired that the invention be limited only within the lawful scope of the appended claims.

This application is a continuation-in-part of application Serial No. 854,233, filed November 20, 1959, and of application Serial No. 862,065, filed December 28, 1959, both of which are now abandoned.

We claim:
1. Organometallic compounds having the formula

$$QM(CO)_4$$

wherein Q is a cyclic diene selected from the class consisting of bicycloheptadiene and cyclooctadiene compounds and M is a group VIB transition metal atom having the electron configuration of the next higher inert gas.
2. The compounds of claim 1 wherein Q is a bicycloheptadiene compound.
3. The compounds of claim 1 wherein Q is a cyclooctadiene compound.
4. The compounds of claim 1 wherein M is molybdenum.
5. The compounds of claim 1 wherein M is chromium.
6. 1,5-cyclooctadiene molybdenum tetracarbonyl.
7. Bicycloheptadiene chromium tetracarbonyl.
8. Bicycloheptadiene molybdenum tetracarbonyl.
9. 1,5-cyclooctadiene chromium tetracarbonyl.
10. A process comprising reacting a compound selected from the group consisting of cyclooctadiene and bicycloheptadiene compounds with a group VIB metal carbonyl.
11. The process of claim 10 wherein the reaction is carried out in the presence of a solvent.
12. The process of claim 10 wherein the metal carbonyl compound is molybdenum hexacarbonyl.
13. The process of claim 10 wherein the metal carbonyl compound is chromium hexacarbonyl.

References Cited in the file of this patent

Pettit.: Journal of the Amer. Chem. Soc., vol. 81, No. 5, Mar. 5, 1959, p. 1266.

Manuel.: Chemistry and Industry, October 1959, pp. 1349—1350.